Aug. 21, 1934.                G. ANCIRA                    1,970,794
      AUTOMATIC MACHINE FOR SETTING-UP AND SEALING
              GLUELESS CONTAINERS (FOLDING BOXES)
                  Filed April 14, 1933        6 Sheets-Sheet 5
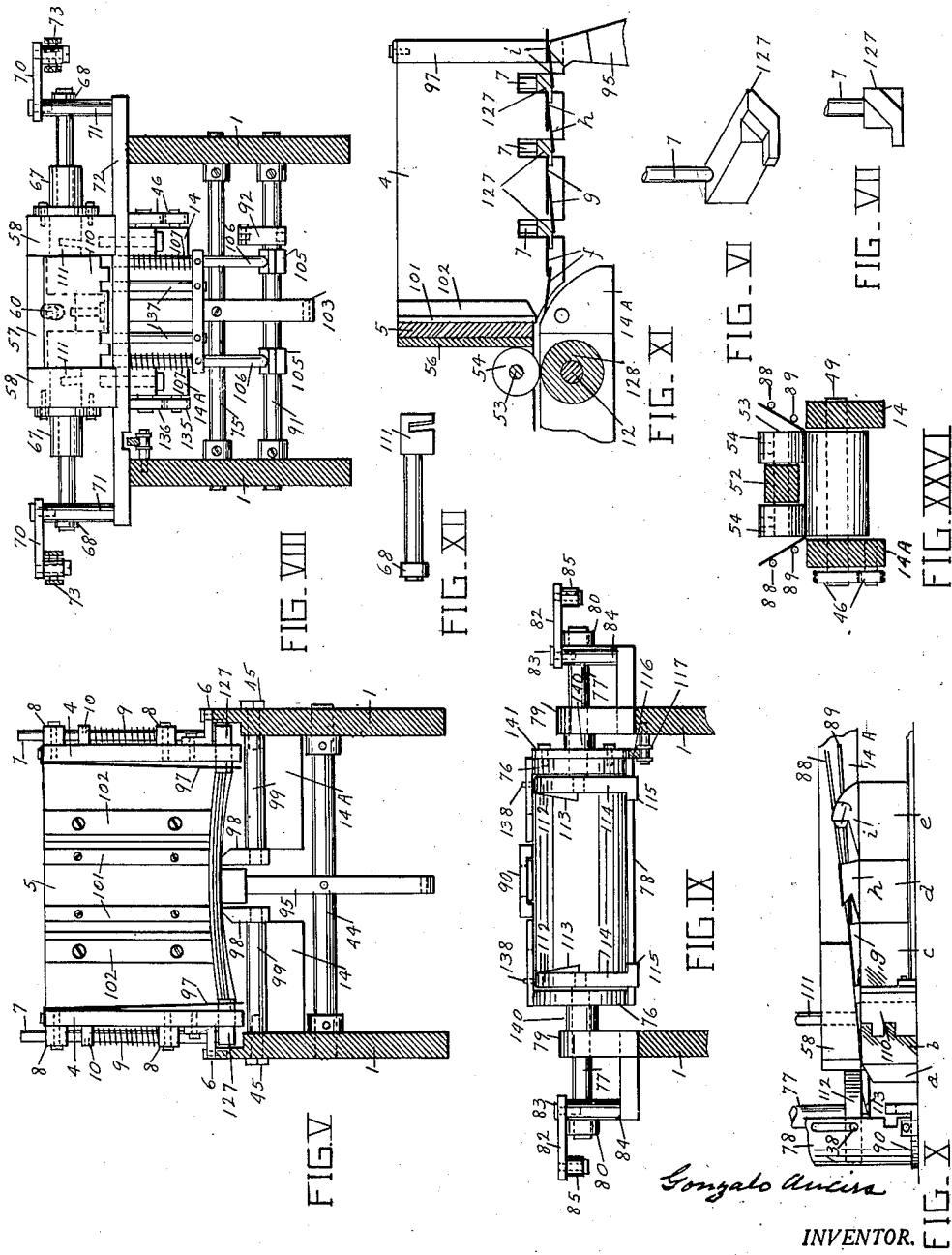
Gonzalo Ancira
INVENTOR.

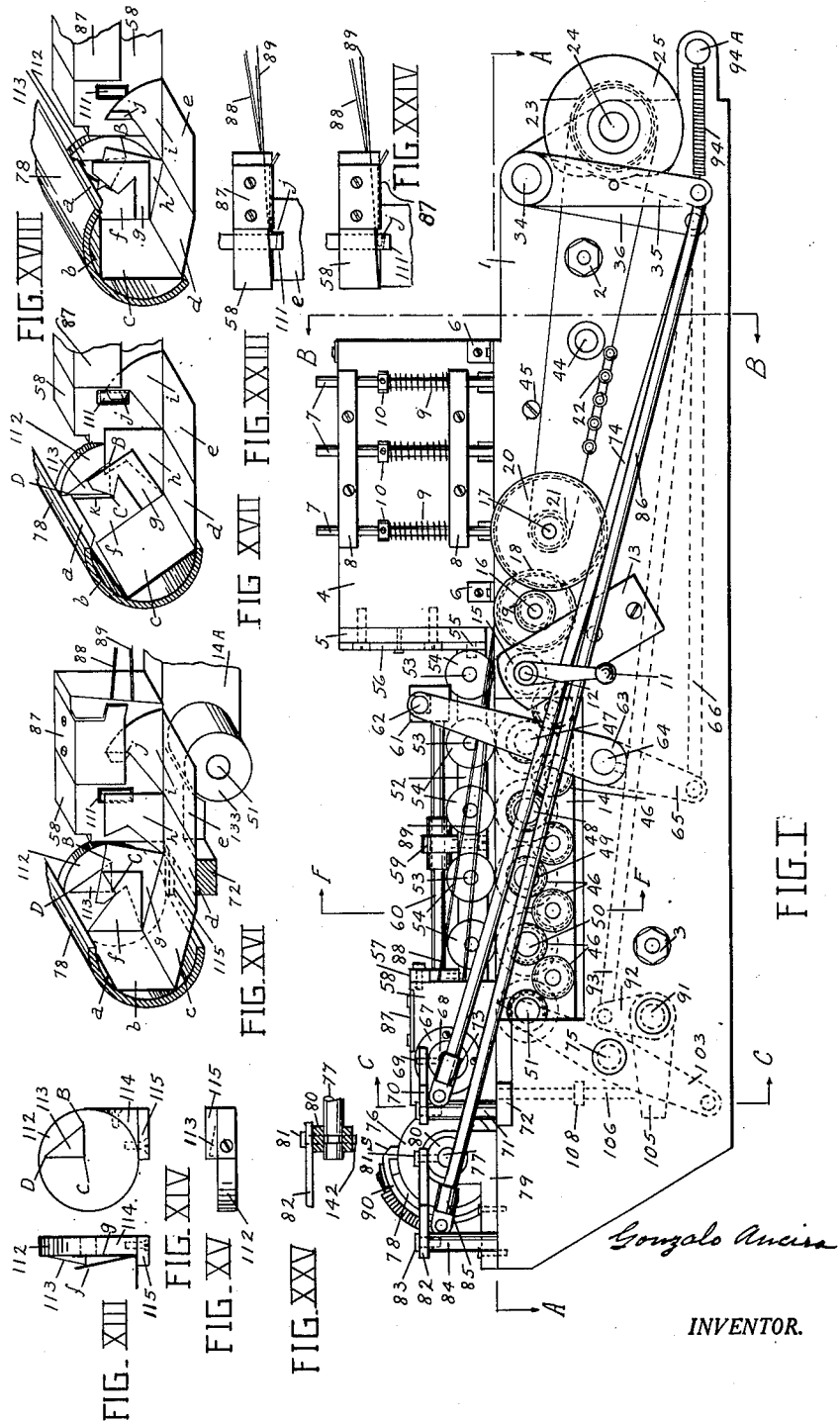

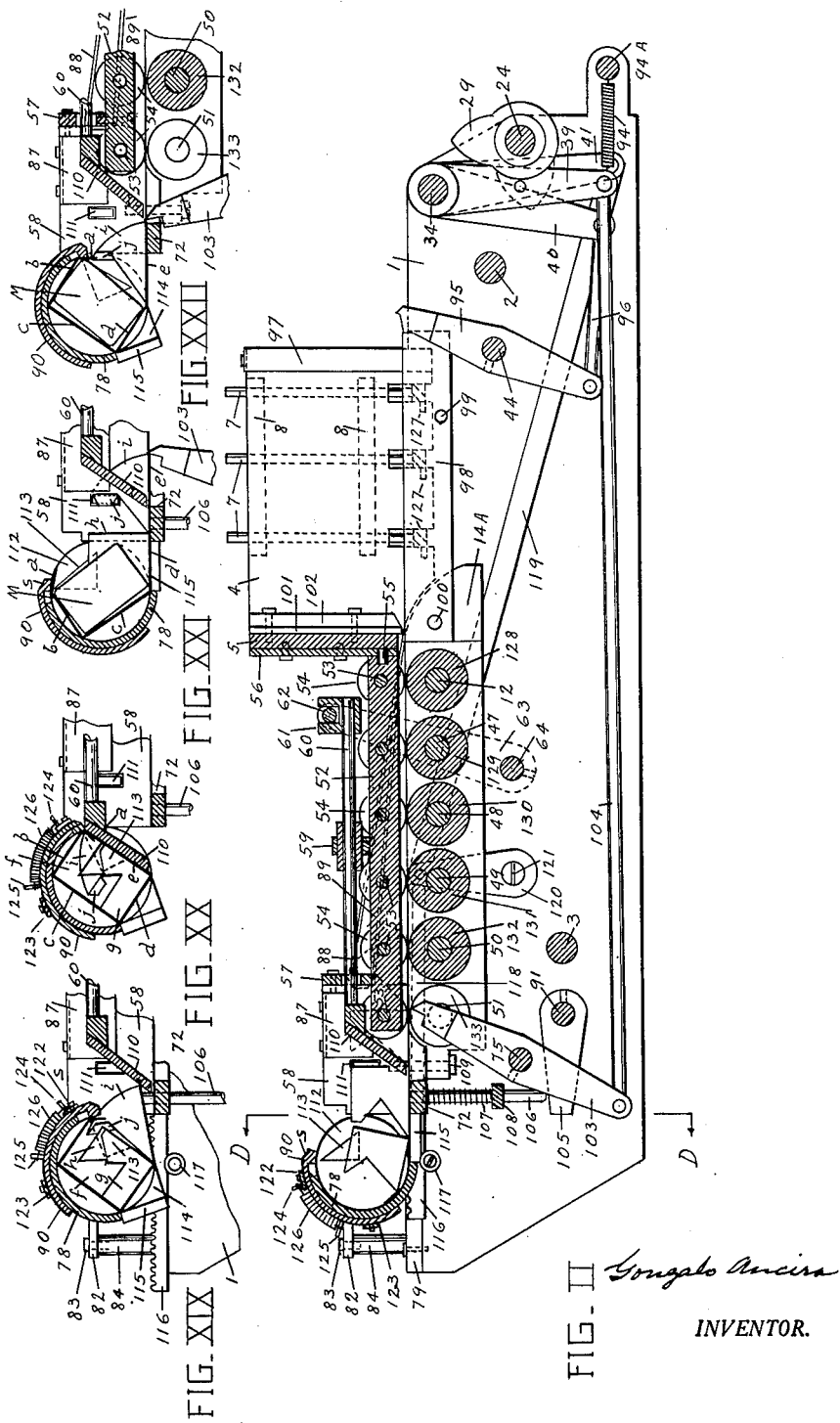

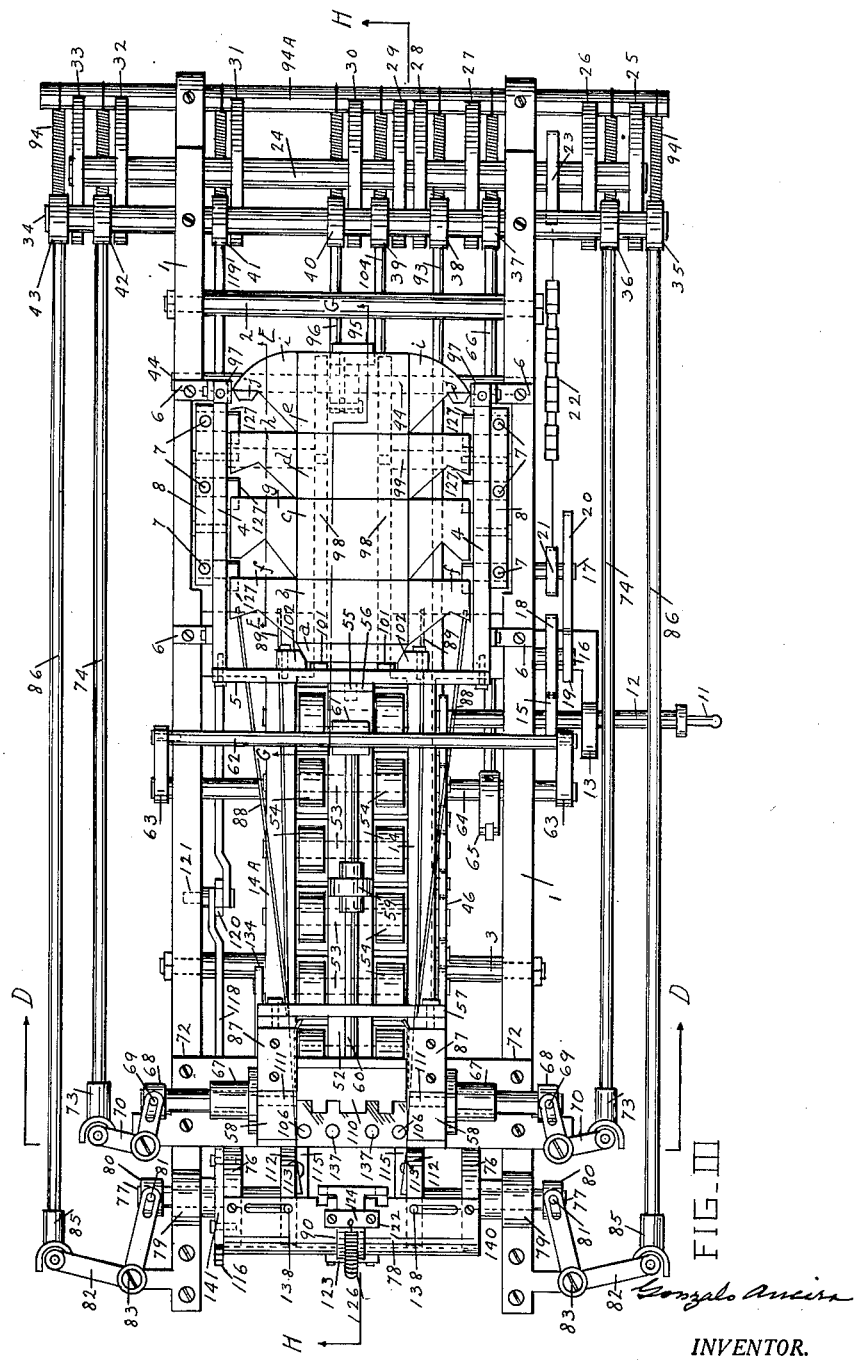
FIG. III

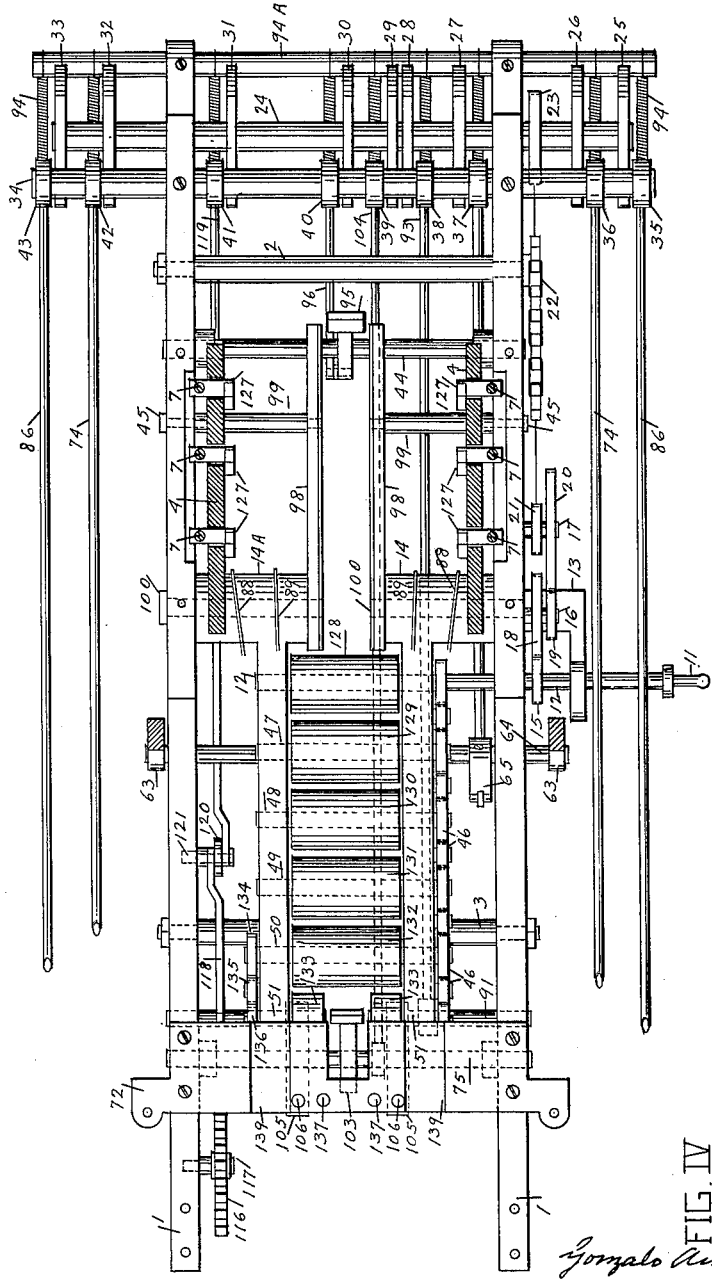
FIG. IV
Gonzalo Ancira
INVENTOR.

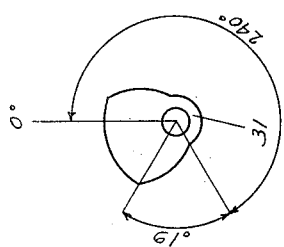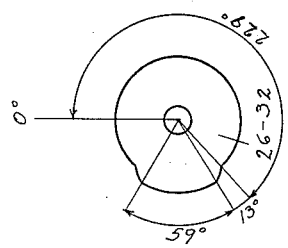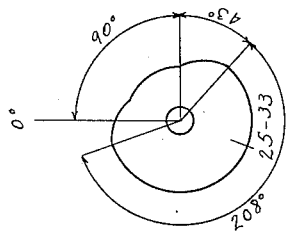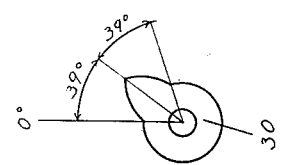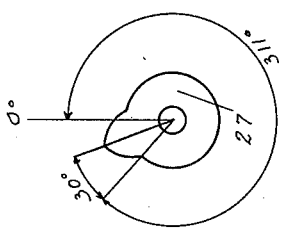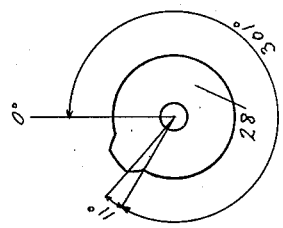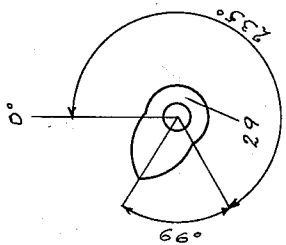

Patented Aug. 21, 1934

1,970,794

UNITED STATES PATENT OFFICE

1,970,794

AUTOMATIC MACHINE FOR SETTING-UP AND SEALING GLUELESS CONTAINERS (FOLDING BOXES)

Gonzalo Ancira, Englewood, N. J., assignor to Ancira Glueless Box Co., San Antonio, Tex.

Application April 14, 1933, Serial No. 666,120

20 Claims. (Cl. 93—49)

My invention relates to improvements in automatic setting-up and sealing glueless containers (folding boxes) and the objects of my improvement are: First, to provide a dependable mechanism which will automatically fold and seal an open cut-out form into a closed box and thus eliminate much of the hand labor required now; second, to conserve floor space by presenting within an improved mechanism a plurality of essential elements in a compact and efficient form; third, to provide means of converting a glueless cut-out form into a folded and sealed box that can not be reopened without being destroyed or leaving traces (evidences) of injury; fourth, to provide an automatic mechanism within which are embodied: (a) a feeder that delivers only one cut-out form at a time and prevents the flaps at each end of said cut-out form from interfering one with another; (b) a conveyor that receives each cut-out form, as the same is ejected from the feeder, and carries it forward while the flaps at each end are folded to a 90 degrees angle; (c) a set of tab-folders that fold the tabs of the rearmost flap at each end of the cut-out form and thus set these folded tabs in a position to become interlocked with the preceding flaps; (d) a flap-interlocker that positions the flaps, one on top of another, then inserts the final flap (whose tab is folded) so that all the flaps may be interlocked; and (e) means for releasing the folded and sealed box from the machine; and, fifth, to provide an automatic mechanism which can be adapted to function with an automatically timed merchandise feeder or present means for staying the forward progress of a cut-out form when the same is fed by hand.

The foregoing objects are obtained by the mechanism illustrated in the accompanying drawings, in which—

Figure I represents an elevational side view of my invention in which some of the parts near but beyond the base wall are suggested by dotted lines.

Figure II represents a longitudinal central section view of this invention taken on the line H—H in Figure III.

Figure III represents a top view of the invention.

Figure IV represents a top view of a section of the invention taken on the line A—A in Figure I as if the upper deck, so to speak, were removed so that the lower rollers of the conveyor, the lower parts of the cut-out form feeder and the connecting rods may be seen.

Figure V represents a cross section taken on the line B—B in Figure I and serves to illustrate the rear end of the cut-out form feeder as well as the rear edges of some positioned cut-out forms.

Figure VI represents a detail view in perspective of one of a plurality of flap-separators employed in the cut-out form feeder for keeping apart the flaps of the cut-out form.

Figure VII represents a front view of the part illustrated in Figure VI.

Figure VIII represents a cross section view (as seen from the front of the machine) taken at the line C—C in Figure I and serves to show more specifically the tab-folding mechanism.

Figure IX represents a view of the flap-interlocking mechanism as that mechanism would be seen from the rear of the machine at the lines D—D in Figures II and III.

Figure X represents a fragmentary half view of the flap-folding mechanism and a part of the flap-interlocking mechanism and shows a cut-out form with its flaps partially folded at a certain point of its conveyance through the machine.

Figure XI represents a longitudinal section of the feeder taken at line G—G in Figure III in which piece 98 was omitted to clearly show the flaps of the cut-out form and said flaps are shown in section at line E—E of said Figure III. This figure shows how the flaps of a cut-out form are separated from the flaps of another.

Figure XII represents a side view of one of the parts that fold the flaps on the cut-out form.

Figure XIII represents a detail showing a side view of one of the parts employed in the flap-interlocking mechanism in which may be observed two of the flaps of a cut-out form.

Figure XIV represents a detail showing a front view of the same part employed in the flap-interlocking mechanism.

Figure XV represents a detail showing a bottom view of the same part employed in the flap-interlocking mechanism.

Figure XVI represents a view in perspective of one-half of a cut-out form in the said flap-interlocking mechanism in which it may be seen that the second flap of the cut-out form has been folded behind the first flap. Figure XVII represents a view in perspective similar to the view represented by Figure XVI but which shows the said cut-out form in a position farther advanced than the position shown in Figure XVI and, in said advanced position, it is to be seen that the third flap of said cut-out form has been folded behind the second flap.

Figure XVIII represents a view in perspective similar to the views represented by Figures XVI and XVII; but, in said Figure XVIII, the flap-interlocking mechanism is shown after it has rotated to a certain degree and it is to be seen that the projecting tab of the third flap of said cut-out form passes between the first and second flaps.

Figure XIX represents a view of the central section of the said flap-interlocking mechanism and shows therein the final wall of said cut-out form as the said wall is being raised and then engaged by part 110 which serves to complete the interlocking of the flaps.

Figure XX represents another and similar view of Figure XIX but shows the flaps of the cut-out form thoroughly interlocked.

Figure XXI represents another central section view of the flap-interlocking mechanism and shows the developed position of the cut-out form at the time the merchandise that is intended therefor is to be inserted therein. It is to be seen here how the merchandise is to be inserted and made to lean against the first two walls.

Figure XXII represents the position of the merchandise when the flap-interlocking mechanism is rotated and it is to be seen here that the final flap is about to be interlocked. Notice in Figures XVI, XVII, XVIII, XXI and XXII that some of the parts of the flap-interlocking mechanism were omitted to simplify the drawings.

Figure XXIII represents a detail of the tab-folding mechanism as seen from its top and it should be observed particularly that the foldable tab has been folded from the face of the flap at an angle of 90 degrees.

Figure XXIV represents same detail of said tab-folding mechanism and shows the position of the foldable tab farther advanced. It should be observed here that the foldable tab has been folded thoroughly and is within the groove of part 111 that caused the tab to fold.

Figure XXV represents a fragmentary view of one of the parts that operate the flap-interlocking mechanism.

Figure XXVI represents a cross section view of the cut-out form conveyor and flap-folder mechanism taken on the line F—F in Figure I and shows the flaps of a cut-out form partially folded, the central portion of said cut-out form being engaged between the upper and the lower rollers. It can also be seen that the gears cause the rotation of the rollers.

Figures XXVII to XXXIII inclusive represent cams, show their respective configurations and each cam is accompanied with the number of degrees (a) to actuate its follower backward and forward and (b) to keep said follower in a backward or forward position.

Similar numerals indicate similar parts throughout the several views.

In Figure I, the numeral 1 indicates one of walls 1—1 which support directly or indirectly all parts of the machine; 2—3, shafts that secure walls 1—1 together and so form a base; 4, one of walls 4—4 which are secured at the rear and on top of walls 1—1; 5, a wall secured by bolts to the front of walls 4—4; therefore, walls 4—4—5 form a box-like receptacle which is designated the feeder (of cut-out forms); 6—6, two of four angles that support walls 4—4 to walls 1—1 by means of bolts; 7—7—7, rods installed on the face (exterior) of each one of walls 4—4; 8—8, guides secured by bolts to walls 4—4, and on said guides 8—8 rods 7—7—7 are adapted to move up and down; 9—9—9, compression springs mounted on rods 7—7—7; and 10—10—10, collars secured to rods 7—7—7 by bolts, the said collars and compression springs 9—9—9 keeping rods 7—7—7 in their uppermost position.

The numerals 11 indicate a crank by means of which the machine may be operated by hand; 12, the shaft to which the crank 11 is secured, said shaft 12 being adapted to rotate on three bearings, one of which is supported by bracket 13 which is secured to wall 1 in Figure I, the other two bearings by parts 14 and 14A. Part 14 is shown in Figure I and part 14A is shown in Figures II and IV; 15 indicates a gear secured to shaft 12; 16—17 indicate shafts arranged to rotate on bearings made on wall 1; 18—19 indicate gears secured to shaft 16; 20 indicates a gear and 21, a sprocket, both of which are secured to shaft 17. Gear 15 meshes with gear 18 and gear 19 meshes with gear 20, therefore, when crank 11 is operated its motion is transmitted to all gears and the sprocket 21 will rotate; 22, a chain which transmits the motion from sprocket 21 to sprocket 23 which is fast on the rotating shaft 24 and on said shaft cams 25 to 33 are mounted rigidly; 25, is the cam shown in this figure; 34, a stationary shaft on which followers 35 to 43 inclusive are mounted loosely so that each follower may be actuated independently. Each follower is provided with a roller that rotates on a pin secured rigidly to the followers and said rollers are in contact with the surfaces of the cams.

The numerals 35—36 indicate the followers shown in the present Figure I; 44 indicates a shaft which is mounted on walls 1—1; 45 indicates a bolt that supports a part behind wall 1; 46 indicates a train of meshed gears installed on the outer face of part 14, this train 46 being formed by two rows of gears, the upper row being mounted rigidly on shafts 12—47—48—49—50—51, and the lower row being arranged to rotate on the headed pivots that are secured to the said part 14. The numerals 52 indicate a square bar provided with six bearings on each of which bearings one of shafts 53 is adapted to rotate. On each end of the said six shafts 53 is one of rollers 54 (only five of which are shown in this figure). The rear of bar 52 is supported by a dowel 55 which engages on a hole on supporter 56 which is secured to wall 5. The front end of said bar 52 is secured to cross-bar 57 which is secured to guides 58—58, only one of which is shown in the present figure. The supporter 56 and cross-bar 57 are provided with elongated holes in order to make bar 52 adjustable in height and so establish contact between the upper row and the lower row of rollers of the conveyor; the numerals 59 indicate a guide secured on top of the square bar 52; 60, a rod inserted in guide 59 and adapted to move forward and backward through an opening on cross-bar 57; 61, a forklike part secured at the rear end of rod 60; 62, a shaft engaged in the forklike part 61 and extends on both sides of said forklike part, the ends of said shaft 62 being secured to levers 63—63 (only one of which levers is shown in this figure) and said levers 63—63 are secured to the ends of shaft 64 which is adapted to swing on bearings on the walls 1—1; 65, a lever which is secured to shaft 64 behind wall 1 shown in this figure; 66, a connecting-rod, one end of which is mounted pivotally to lever 65, the other end being connected in like manner to follower 37 which engages the cam 27; 67—67, flanged bushings secured to parts 58—58 and adapted to guide the tab-folders which are to be described in Figure II and to be shown in Figure XII. Only one of said flanged bushings is shown in the present figure; and 68—68 indicate collars mounted on the tab-folder mentioned, the upper part of each of said collars being provided with a pin 69 to engage bell-crank levers 70—70, only one of which is shown in the present figure.

The numerals 71—71 indicate upward projecting arms secured to the flat part 72 which is secured by bolts on top of the walls 1—1. Only one of said arms 71—71 is shown in the present figure. The numerals 73—73 indicate universal joints secured to one of the arms of the bell-crank levers 70—70 and said universal joints are further secured to connecting-rods 74—74 which betransmit the motion of followers 36 and 42 which engage cams 26 and 32, respectively; 75 indicates the end of a shaft which is supported by walls 1—1, the purpose of which is to appear in the description of Figure II; 76—76 indicate disks loosely mounted on shafts 77—77 and are fastened to the half-cylinder part 78. Shafts 77—77 are adapted to rotate and to move in and out through the opening made on disks 76—76 and on the bearings which support them. The numerals 79—79 indicate bearings to support shafts 77—77; 80—80, collars engaged to shafts 77—77, a detail of which engaging mechanism is to be described in Figure XXV. The numerals 81—81 indicate headed pins secured to collars 80—80; 82—82, bell-crank levers which engage pins 81—81 and are adapted to swing on bolts 83—83 which are secured to projections 84—84. When said levers 82—82 are actuated, shafts 77—77 are moved in and out. Numerals 85—85 indicate universal joints secured to bell-crank levers 82—82; 86—86, connecting rods secured to universal joints 85—85 and to followers 35 and 43 which engage cams 25 and 33, respectively; 87—87, downward projecting guide parts secured to parts 58—58; 88—88 and 89—89, cables secured from the rear of parts 14—14A to the rear of guides 58—58.

The numerals 90 indicate a curved part that is adapted to slide on the exterior face of the half-cylinder part 78. The controlling means as well as the guides for said part 90 are to be described in Figure II. The numerals 91 indicate the end of a shaft adapted to rotate on bearings on walls 1—1; 92, a lever secured to shaft 91 and connected to rod 93 which is connected to follower 38 which engages cam 28; 94, nine extension springs which are secured to followers 35 to 43 inclusive. The rear ends of said springs 94 are secured to the stationary rod 94A secured at the rear of walls 1—1. Parts 103—105—106—108 are to be described in the next figure.

In Figure II, numerals 95 indicate a finger adapted to swing with shaft 44 and is provided on top with a small upward projection: Its bottom is connected with connecting-rod 96 and said rod is connected to follower 40 which engages cam 30; 97—97, spring guides which are secured at the top only of walls 4—4, thus leaving the bottom unsecured, so that their lower ends may be separated from the faces of walls 4—4 by virtue of the elasticity or springing action of the material used and 98—98 indicate rails supported by rods 99—99 and 100—100 to walls 1—1. It will be seen in the forthcoming Figure IV that said rods 100—100 also support parts 14—14A. In the preceding Figure I it may be seen that rods 99—99 are supported by bolts 45—45.

The numerals 101—101 indicate gauges secured to the interior face of wall 5 by means of bolts that pass through elongated holes so that said gauges 101—101 may be adjusted in height; 102—102 indicate guides fastened on wall 5, the object of which is to locate the cut-out forms in the center of the feeder. 103, a finger, the lower end of which is pivotally connected to connecting-rod 104, follower 39 and cam 29, the said finger being adapted to swing with shaft 75; 105—105, levers secured to shaft 91 on the front end of which rods 106—106 rest and these rods, extending upward, pass through part 72; 107—107, compression springs mounted on rods 106—106. The said compression springs act between piece 72 and cross-connecting part 108 which is secured to rods 106—106 in order to keep them in their lowermost positions; see Figure VIII. 109—109, are bolts which secure the front ends of parts 14—14A to part 72.

The numerals 110 indicate a slanted part secured to the front end of rod 60 and which is adapted to move forward and backward. Observe the open space between said slanted part 110 and part 72. Numerals 111—111 indicate the tab-folders which pass through the openings in guides 58—58 and through the flange bushings 67—67 that are mounted on the outside faces of said guides 58—58. These tab-folders are adapted to move in and out from the center of the machine when the bell-crank levers 70—70 are actuated. In Figure VIII it may be seen that said tab-folders are provided with slots suggested by dotted lines, and in Figure XII a detail view may be seen. The numerals 112—112 indicate disks fitted inside of the half-cylinder part 78 and these said disks are adapted to be moved in and out from the center of the machine. These disks are provided with the triangular projections 113—113, corner projections 114—114 and the outward projections 115—115, all three projections being secured to each disk 112—112. See Figures XIII, XIV and XV showing disks 112—112, and projections 113—113, 114—114 and 115—115. These disks are secured to shafts 77—77 which are actuated by the bell-crank levers 82—82, rods 86—86 and cams 25 and 33. Numerals 116 indicate a rack adapted to be moved to the front and to the rear and engage a gear, which gear is to be described in Figure IX; 117, a guide roller mounted on a stationary pin secured to wall 1 and said roller is adapted to rotate when said rack 116 is actuated; 118, a rod secured to the rear end of rack 116; and 119, a connecting-rod one end of which is connected to lever 120 which is connected to rod 118. The other end of rod 119 is supported to follower 41 which engages cam 31.

The numerals 121 indicate a stationary pin secured to wall 1 and on said pin lever 120 is adapted to swing; 122—123, guides secured on the exterior face of the half-cylinder part 78 in order to make part 90 slidable around said part 78; 124, a pin projecting upward from guide 122; 125, a pin projecting from said curved part 90; 126, an extension spring one end of which is secured by pin 124 on guide 122, the other end being secured by pin 125 on the curved part 90; therefore, said spring 126 will pull the bottom of the curved part 90 upward; 127—127—127, flap separators secured to the bottom of rods 7, said separators being adapted to move up and down in the notches on walls 4—4. Each of said walls 4—4 has three flap separators; and 128—129—130—131—132 indicate the lower row of rollers of the conveyor and are secured to shafts 12—47—48—49—50, respectively, which rotate on parts 14 and 14A, as will be shown in Figure IV.

The numerals 133—133 indicate two rollers located at the front end of the conveyor and secured to shafts 51—51, as can be seen in Figure IV. As stated in the description of Figure I, the train of gears 46 installed on part 14 are arranged to rotate when the crank 11 is actuated and, since the gears of the upper row are secured to the same shafts to which rollers 128 to 133 inclusive are secured, all of said rollers will rotate when said crank is actuated. It is to be seen, however, that shaft 50 is provided with a second gear 134 located on the outer face of part 14A and that this said gear 134 transmits its motion to gear 135 by means of gear 136, therefore, rollers 133—133 will rotate in a like direction and with a like speed to that of rollers 128 to 133 inclusive. Gears 134—135—136 are not shown in this figure but in Figure IV.

In Figure III, the numerals 137—137 indicate the upper ends of rods which are secured to cross-connecting part 108 which is secured to rods 106—106, these said rods and also rods 137—137 being adapted to move up and down when levers 105—105 and 92 are actuated. Numerals 138—138 indicate pins each one of which is secured to disks 112—112.

Inasmuch as said pins 138—138 are engaged in the slots on the half-cylinder part 78, when the disks 112—112 are moved in and out from the center of the machine by means of bell-crank levers 82—82, part 78 does not alter its position and, when rotated by means of the gear 141 which is to be described in Figure IX, the disks 112—112 rotate also because of the engagement of pins 138—138 in slots in said part 78.

In Figure IV, the numerals 139—139 indicate grooves on part 72 to effect cooperation in supporting parts 58—58. The cams 25 to 33 inclusive, which are shown in this figure appear to be of like diameter but the purpose has been to simplify the drawings: Details or said cams are to appear in Figures XXVII to XXXIII inclusive.

In Figures V, VI, VII and VIII, the parts shown have been described in preceding figures.

In Figure IX, the numerals 140—140 indicate collars mounted on shafts 77—77 to prevent lateral motion of the half-cylinder part 78; 141, gear secured to one of the disks 76 and engages rack 116.

In Figures X to XXIV inclusive, the parts shown have been described in preceding figures.

In Figure XXV, the numerals 142—142 indicate pins secured at the bottoms of collars 80—80 which are mounted on shafts 77—77. These shafts 77—77 are provided with grooves into which the inner ends of pins 142—142 project; therefore, when shafts 77—77 rotate, the position of collars 80—80 is not altered, so when the bell-crank levers 82—82 move the collars 80—80 in and out, shafts 77—77 also move in and out.

In Figure XXVI, the parts shown have been described in preceding figures.

In Figures XXVII to XXXIII inclusive, the numerals from 25 to 33 inclusive indicate various cams which are mounted rigidly on cam-shaft 24, the cams being so positioned as to actuate their followers at certain desired times in order to assure the operation required to produce a complete sealed box with each rotation of said cam-shaft 24. Each cam is marked with the number of degrees required to actuate the respective follower forward and backward, also with the number of degrees to keep the follower in its required position. For example: Cam 30 will require 39 degrees to move its follower to the front and, when so moved, a like number for its return. Cams 25 and 33, which are alike, will require 43 degrees to move their followers to the front and there said followers will remain for the time necessary for said cams to rotate 208 degrees, then another 43 degrees become necessary to return said followers to their former positions.

My machine is intended to function in the following manner, to-wit:

A stack of cut-out forms of the type described in allowed application Serial Number 567,928 is placed within the receptacle formed by walls 4—4—5 of the feeder. See Figures III and V. Because of the projections formed by the scoring of the cut-out forms, said forms, when stacked, tend to curve as may be seen by the rear edges of a few such forms in Figure V. To locate the cut-out forms in the center of the feeder (ejecting position) the narrow walls a of said forms are placed between the stationary guides 102—102 and flaps i—i are centered by the spring guides 97—97. These spring guides are fastened only at the top on walls 4—4 therefore their lower ends have the tendency of projecting toward the center of the feeder, whereby they will contact flaps i—i thus keeping the cut-out forms in ejecting position.

Walls a—b—c—d—e of the cut-out forms rest on stationary rails 98—98, flaps f—g—h—i project on the sides of said rails. The rear ends of flaps f—g—h rest on projections that extend forward from the six flap-separators 127, and it is to be remembered that said separators are adapted to move up and down. When there are no cut-out forms in the feeder, the separators remain in their uppermost position on account of springs 9 mounted on rods 7, but when the cut-out forms are stacked, the weight of said forms will force said flap-separators downward and thus keep their projections in contact with the lowermost cut-out form whereby the rear inclined face of the separators will become located directly in front of the flaps of the lowermost cut-out form. When crank 11 is actuated, its motion will be transmitted to cam-shaft 24 which will cause all cams to rotate. Assuming that cam-shaft is so located that cam 30 will actuate first, hence the starting point of this cam is marked at 0; see Figure XXVII. When this cam has rotated 39 degrees from 0, finger 95 is actuated and the small upward projection of said feeder will engage and convey forward the lowermost cut-out form of the stack. As said cut-out form is conveyed, the front end of its flaps will become in contact with the inclined face of the separators, whereby said flaps will be bent downwardly thus passing underneath the separators. See Figure XI showing in section the flaps of two cut-out forms which were placed to rest on the forward projections of the separators, but when finger 95 was actuated flaps g—h—i of the lowermost cut-out form became in contact with the inclined face of the separators and were forced away from the flaps of the next upper cut-out form. Finger 95 will convey the cut-out forms far enough forward to be engaged by the rollers of the conveyor, after which finger 95 will be actuated backwardly. Notice in Figures XI and V that the rear ends of pieces 14 and 14A are curved, the object of which curves being to bend the flaps upward when the cut-out form is ejected from the feeder. In said Figure XI flap f of the lower cut-out form is contacting the rear curved face of piece 14A. In Figure II it can be seen that the lower edge of gauges 101 is close to the top of rails 98. These gauges are provided with elongated holes so that they can be adjusted at a certain distance from said rails 98 to present a space which will only permit the ejection of one cut-out form at the time.

When a cut-out form is ejected from the feeder, it is engaged by the rollers 54 and 128 and these rollers convey the said form to the subsequent rollers of the conveyor. By means of the train of gears 46 and by gears 134—135—136, rollers 128 to 133 inclusive are arranged to rotate simultaneously when the crank 11 is actuated. These rollers are made, preferably, of rubber and contact with the six upper rollers 54 of the conveyor, therefore, said upper rollers will rotate when said lower rollers rotate and when ejected from the feeder will convey the cut-out form toward the front.

In Figure III observe that the cut-out form will be conveyed along the tops of cables 88—88—89—89 and, since said cables rise and approach each other at the front of the conveyor and since the walls a—b—c—d—e are engaged between the two rows of rollers, the flaps f—f—g—g—h—h—i—i will be folded upward to a position of 90 degrees.

In Figure X may be seen how the flaps become folded further as they approach the front of the conveyor.

In said Figure X the upper part of the conveyor and the projecting guides 87—87 do not appear in order to illustrate more clearly the position of the cut-out form. See also Figure XXVI in which the walls of the cut-out form may be seen engaged between the rollers while the flaps lean against the cables. When flaps f—f to i—i inclusive have been folded to nearly 90 degrees, they are passed through the space formed by the downward projecting guides 87—87 and guides 85—85; the walls are passed underneath the slanted part 110 and the flat part 72. In Figures II and X observe that the front end of the cut-out form is carried by the conveyor into the flap-interlocking mechanism which, for the most part, is formed by the half-cylinder part 78 and disks 112—112, until the rear end of the cut-out form is released from the foremost rollers 54—54 and 133—133, at which time it takes the position shown in Figure XVII. To lead the cut-out form into the flap-interlocking mechanism corner guides 114—114 and projecting guides 115—115 are provided. See Figures II, III, X and XVI.

When cams 25 and 33 have rotated 90 degrees from 0, disks 112—112 are moved to the position shown in Figure III in order to receive the cut-out form which is still engaged in the conveyor. For disks 112—112 to move from the position shown in Figure IX to that of Figure III will require 43 degrees. In Figure XXVIII see cams 25 and 33. Disks 112—112 will be held in said position until the cut-out form is sealed and, to perform all sealing operations, cams 25 and 33 will rotate 208 degrees.

In Figure II observe when the front end of the cut-out form is slid into the half-cylinder part 78, the walls of the said cut-out form fold along the scored lines that divide said walls. In Figure XVI observe the cut-out form in a somewhat more advanced position. In this way the cut-out form is moved by the conveyor until the wall a projects outward from said half-cylinder part 78. Now see Figure XVII and the cut-out form being released by the conveyor.

To prevent wall a from projecting beyond the circumference of disks 112—112, the curved part 90 is provided. See said piece 90 in Figure III: The two side arms at its front project outward from the half-cylinder part 78 and since said side arms are provided with projections that extend downward, said downward projections will keep wall a as shown in Figure XXI. See also Figure IX in which said two side arms of the curved part 90 and the downward projections are shown.

When the front end of the cut-out form is released from the conveyor, said cut-out form will be positioned as shown in Figure XVII in which flaps f—f and g—g are ready to be interlocked. These flaps are guided by the triangular projections 113—113 secured to disks 112—112. Figures XIII, XIV and XV show said disks 112—112 in detail and it will be seen that the edges B—D—B—D are flush with the faces of said disks and the vertex C—C project from said faces; therefore, the edges B—C—B—C and D—C—D—C have a wedgelike shape.

When the cut-out form is carried into the flap-interlocking mechanism, the tendency of said cut-out form is to spread its flaps open and when they contact with the vertex C—C of triangular projections 113—113, said flaps are bent inward toward the center of the machine, thus leaving a space between the outside faces of said flaps and the faces of disks 112—112. Figure XIII shows the rear edges of flaps f—f and g—g in which the flaps f—f lean against the vertex C—C and the flaps g—g lean against the faces of disks 112—112; therefore, when the cut-out form is pushed farther, the flaps g—g will be folded behind the flaps f—f as shown in Figure XVI. Flaps f—f and g—g in Figure II are in the same position as shown in Figure XIII.

When the rear end of the cut-out form is in the position shown in Figure XVII (that is, when released from rollers 54—54—133—133) the said cut-out form becomes at rest temporarily so that the tabs j—j may be folded. At this stage, observe the positions of flaps h—h which have been folded on top of the flaps g—g. This is due to the triangular projections 113—113 which act on flaps h—h as with flaps f—f—g—g, that is, the said flaps are inserted between the faces of disks 112—112 and the outside faces of preceding flaps.

Folding of the tabs is performed by tab-folders 111—111 actuated by cams 26—32 which are alike. When said cams have rotated 229 degrees from 0, tab-folders 111—111 which are normally recessed in guides 58 to permit the passing of the flaps without interference, are moved inward to the center of the machine and as tabs j—j are directly in front of the tab-folders, (see Figure XVII) said tabs also are moved inward, but as the upper rear sections of flaps i—i are still behind the projecting guides 87—87, tabs j—j will fold along the scoring between tabs and the flaps. See Figure XXIII which shows from above tabs j—j folded; at this stage the operator is to release the crank 11 and feed the merchandise M by hand in the position shown in Figure XXI. Having fed the merchandise, the operator resumes actuating crank 11 and thus causes cam 29 to actuate finger 103. The said cam 29 is now 235 degrees from O, and when said cam rotates 5 degrees from said 235 degrees, the upper part of finger 103 will be raised high enough to engage the cut-out form (see Figure XXI) after which it will require 61 degrees for finger 103 to move to the position shown in Figure XXII. When finger 103 engages the cut-out form, cam 31 (now 240 degrees from O) will rotate the half-cylinder part 78 and 61 degrees will be required for it to be in the position shown in Figure XXII, therefore, cams 29—31 will complete their actuation at the same time.

As has been stated, when the cut-out form was in the position shown in Figure XVII (before the rotation of the half-cylinder part 78) flaps h—h were located behind flaps g—g. Observe in said figure that the edges k—k of flaps f—f rest against the faces of disks 112—112, therefore, the edges D—C—D—C of the triangular projections will project farther from the faces of said disks than the edges k—k of said flaps f—f; hence when the half-cylinder part 78 rotates, projections 113—113 will guide the front ends of flaps h—h to pass between the inside faces of flaps f—f and the outside faces of flaps g—g. Figure XVIII shows the position of the half-cylinder part 78 when about to complete its rotation, in which position the front ends of flaps h—h are partially between flaps f—f and g—g.

Before the half-cylinder part 78 was rotated tabs j—j of the cut-out form were folded as shown in Figure XXIII, therefore, when finger 103 and the rotation of the half-cylinder part 78 moved said cut-out form to the front the tabs j—j were forced into the slots of the tab-folders 111—111 as shown in Figure XXIV and the tabs were folded against the inside faces of flaps i—i, thus completing the tab-folding operation after which, tab-folders 111 are moved backward to their recessed position.

When said actuations are completed, finger 103 will be actuated backward but the half-cylinder part 78 will remain in the position shown in Figure XXII until the cut-out form is sealed and released from the machine. At this stage the cam-shaft 24 will have rotated 301 degrees from o in order to position cam 28 to actuate rods 106—106—137—137 and 11 degrees will be required to raise said rods to the positions shown in Figure XIX in which positions said rods will have raised wall e and flaps i—i. When said flaps i—i are so raised with tabs j—j in folded position the front ends of said flaps contact edges D—B—D—B of the triangular projections 113—113 and since the edges K—K of flaps f—f are behind the edges D—C—D—C of said projections 113—113, flaps i—i will be led between the inside faces of flaps f—f and the outside faces of flaps h—h.

At this stage cam 27, which will have rotated 311 degrees, will actuate the slanted part 110 toward the front and 30 degrees will be required to carry said part to the position shown in Figure XX. In Figures III and VIII it may be seen that said slanted part 110 is provided with four notches located at its bottom edge so that said part 110 may be moved toward the front while rods 106—106—137—137 remain in their uppermost positions. Said part 110 will engage the rear edge of wall e of the cut-out form and because of the slanted position said wall e will be raised when said slanted part 110 is moved to the front.

When wall e is raised so also will be flaps i—i until they become inserted thoroughly in which position (see Figure XX) the tabs j—j, which are inserted folded, unfold inside of the box made of the cut-out form, therefore, all flaps become interlocked.

While flaps i—i are being raised the narrow wall a is still held in position by the curved part 90 and because of the latter's sloping face S which contacts the upper edge of the slanted part 110, said curved part 90 will be forced backward, thus leaving wall a as shown in Figure XX, inside of the sealed box.

As may be seen in the allowed application for a patent on the cut-out form (blank), said form is glueless and to be sealed only by its flaps in the manner described; therefore, a box developed from a flat, glueless cut-out form is now ready to be released from the machine. To effect such release, cams 25—33 will move disks 112—112 from the positions shown in Figure III to that in Figure IX and at this same time cam 27 will actuate the slanted part 110 backward from the position shown in Figure XX to that shown in Figure II. The reversing movements of said parts 110—112—112 release the filled and sealed box which, because of its weight, will fall through the space between said half-cylinder part 78 (now in the position shown in Figure XX) and the flat part 72, after which said half-cylinder part 78 will return to its original position in Figure II, at which time a second cut-out form is engaged by the conveyor. When the slanted part 110 is returned, spring 126 will actuate said curved part 90 again to the position shown in Figures III and XIX and thus become ready to engage wall a of said second cut-out form.

Although cables (88—89) have been provided to fold flaps of the cut-out form in the conveyor, other material shaped properly or a casting made to describe a profile like that formed by said cables may be used.

The purpose of said cables, castings or material shaped otherwise and their locations near the ends of the rollers is to raise parts of cut-out forms until their flaps are folded.

Rollers of the conveyor may be made of various materials, but I prefer and recommend something elastic, such as rubber so that, a cut-out form may receive a firm grip and thus be prevented from slipping.

In lieu of rollers, an installation of belts mounted on pulleys may be made; and, if made, the pulleys should be located close to each other and an edge of the belt should press directly on the scoring of the cut-out form.

Parts 58 have been referred to as guides inasmuch as they do guide a cut-out form from the conveyor to the flap-interlocking mechanism; these parts 58 serve also as supporters by holding between themselves and parts 87 the flaps of a cut-out form.

After a cut-out form has been released from the conveyor, the progress of said cut-out form is arrested and it is supported at rest momentarily while its tabs become folded.

Parts 111 are shown with a slot: If said parts 111 were replaced by a member recessed in the wall of part 58 with a face located behind the tab to be folded, adapted to push the tab and to remain in position until the cut-out form is moved, thus passing the partially folded tab behind said member, no such slot would be required.

Springs 9 serve in the method preferred for adjusting the height of flap-separators 127; said springs 9 can be replaced, however, by levers pivotally mounted and possessing an arm to counterbalance the weight of a stack of cut-out forms.

Guides 97, adapted to center the cut-out forms, can be replaced also by levers similar to the levers referred to in the preceding paragraph, inasmuch as in lieu of the action of a spring, the weight of a lever can be made to serve.

In ordinary boxes whose flaps do not have to be interlocked, it does not matter whether said flaps become folded thoroughly or not: In my machine's product whose flaps do have to become interlocked, the points of said flaps must meet; if they do not the folded tab will not actuate to interlock them. In this specification and in the claims the expressions "cut-out form", "folded cut-out forms" and "interlocked cut-out form" are used. Whenever the expression "cut-out form" appears, I mean a blank or a carton blank, or a blank for forming folding boxes or shipping containers, and whenever the other two expressions appear, I mean a folded box or a folded container. Having described my invention, I claim:

1. In a machine of the class described comprising a blank feeder adapted to receive a stack of unfolded blanks and to eject therefrom one of said blanks at a time; conveying means; flap folding means; means for folding the tabs backwardly against the members from which said tabs project; flap-interlocker having means for disposing the flaps and folded tabs in interlocking position and means for closing the blank; means for ejecting the erected blank and means for actuating the movable parts of the machine.

2. In a machine of the class described, a supporting frame; a cut-out form feeder having flap-separators; a conveyor; flap-folding projections adjacent the ends of said conveyor; tab-folders having bending and supporting means; flap-interlocker having wedge-like flap guiding projections, and a timed mechanism to actuate the various parts of the machine.

3. In a machine of the character described, a supporting frame; a cut-out form feeder provided with a plurality of flap-separators said separators having a projection for contacting the cut-out forms; a conveyor comprising two sets of rotating rollers; flap-folding projections adjacent the ends of said conveyor; tab-folders having means to bend the tabs, and a space between flap-supporting walls; flap-interlocker comprising means for receiving and supporting the cut-out form, and wedge-like projections for locating the flaps in interlocking position, and a timed mechanism to actuate the various parts of the machine.

4. In a machine of the class described, a supporting frame; a feeder having a receptacle for cut-out forms, flap-separators comprising a projection to contact the cut-out form to be ejected, and an inclined face to separate the flaps of one cut-out form from the flaps of another; a conveyor adapted to engage the walls of the cut-out form; projections located on the sides of the conveyor for raising and folding the flaps of said cut-out form; tab-folders having means to receive and support the flaps during the tab-folding operation, and movable members adapted to engage and fold the tabs; flap-interlocker having a curved wall, side walls, wedge-like flap-guiding projections, and means for raising and interlocking the final wall of the cut-out form, and a timed mechanism to actuate the various parts of the machine.

5. In a machine of the class described, a supporting frame; a cut-out form feeder having flap-separators provided with means for adjusting their position, said separators having a projection adapted to contact the cut-out forms, an inclined face alignable in the path of and adapted to separate the flaps of one cut-out form from the flaps of another, and means for supporting the stack of cut-out forms; a conveyor comprising two sets of rollers, the outer face of one of said sets corresponding in line with the scores that divide the walls from the flaps of the cut-out form, and stationary projections adapted to raise and fold the flaps when the cut-out form is conveyed; tab-folders comprising means to support the flaps during the tab-folding operation, tab-folding members adjacent the tab-supporting members adapted to partially bend the tabs, and means for conveying the cut-out form after the tabs have been partially bended; flap-interlocker comprising a half-cylinder piece, movable disks fitted into said half-cylinder piece, wedge-like projections mounted on the disks, movable member adjacent the half-cylinder piece to keep the narrow wall of the cut-out form in position, and a timed mechanism to actuate the various parts of the machine.

6. In a machine of the class described, a supporting frame; a cut-out form feeder provided with means for locating the cut-out form in position to be ejected, a plurality of flap-separators to prevent the flaps of the ejecting cut-out form from being interwoven with the flaps of the other forms, and an ejector adapted to engage a cut-out form at a time; a conveyor having flap-bending projections adjacent the ends of said conveyor; tab-folders having means for supporting the flaps of the cut-out form temporarily at rest to permit the tab-folding members to partially fold the tabs, and means for conveying the cut-out form forwardly so as to pass the partially folded tabs behind said folding members; a flap-interlocker comprising means for receiving the cut-out form, means for guiding the flaps to their interlocking position, means for releasing the folded cut-out form, and a timed mechanism comprising cams, followers, connecting rods, and levers to actuate the various parts of the machine.

7. In a machine of the class described, a supporting frame; a cut-out form feeder provided with means to support and locate the cut-out forms in position to be ejected regardless the degree of curvature said cut-out forms may tend to assume, a gauge located in the path of the cut-out forms to prevent the ejection of more than one cut-out form at a time, an ejector, and a plurality of flap-separators; a conveyor adapted to receive a cut-out form and to convey the same with the flaps in contact with the projections adjacent to said conveyor; a tab-folding mechanism having guides to receive and support the cut-out form, tab-folding members normally in recessed position, means for actuating said tab-folding members to partially fold the tabs, a space formed behind the tab-folding members when said members are in projecting position to permit the passing of the partially folded tab through said space whereby the tab-folding operation is completed; a flap-interlocker comprising a half-cylinder piece adapted to receive the cut-out form and to fold the creases dividing the walls of said cut-out form, said cut-out form having means to effect its partially revolving operation, side disks fitted into said half-cylinder piece adapted to be moved in and out and to partially revolve with the half-cylinder piece, wedge-like projections fastened on the side disks to locate the flaps in interlocking position, means for supporting the narrow wall of the cut-out form in engaging position, means for raising the final wall of the cut-out form to its interlocking position, and means for releasing the folded box, and a timed mechanism to actuate the various parts of the machine.

8. In a machine of the class described, a supporting frame; a cut-out form feeder comprising a receptacle, side guides adapted to contact the edges of the cut-out form regardless the curvature of said forms so as to locate them in a position to be ejected, supporting rails, flap-separators provided with means for adjusting themselves in contact with the face of the cut-out form to be ejected, said separators are also provided with an inclined face which forces the flaps of the ejecting cut-out form away from the flaps of another cut-out form, a gauge which permits the ejection of one cut-out form at a time, and an ejector adapted to engage a blank on every stroke; a conveyor adapted to receive the cut-out form, said conveyor is provided with slanting flap-folding projections; tab-folders having guiding walls between which the flaps are passed, tab-folding members adapted to project from their recessed normal position to partially fold the tabs, said folding members are also adapted to stay in said projecting position to permit the passing of the partially folded tabs behind said folding members; a flap-interlocker having a half-cylinder piece adapted to receive a portion of the cut-out form, movable side walls, flap-guiding projections, a support for keeping the narrow wall in engaging position, means for partially rotating said half-cylinder piece, means for conveying the cut-out form in co-operation with the half-cylinder piece, means for raising the final wall of the cut-out form, means for releasing the folded cut-out form, and a timed mechanism to actuate the various parts of the machine.

9. In a machine of the class described, a supporting frame; a cut-out form feeder provided with flap-separators and an ejector; a conveyor having means to fold the flaps when the cut-out form is conveyed, tab-folders comprising folding and supporting members; a flap-interlocker comprising a main wall adapted to receive the cut-out form and bend the creases dividing the walls of said cut-out form, movable side walls provided with wedge-like projections adapted to locate the flaps in interlocking position, a movable member for supporting the narrow wall of the cut-out form in engaging position, movable members to raise the final wall of the cut-out form whereby the flaps adjacent to said wall become interlocked, means for releasing the folded cut-out form, and a timed mechanism to actuate the various parts of the machine.

10. In a machine of the class described, a supporting frame; a cut-out blank feeder provided with flap-separators and an ejector; a conveyor provided with means for folding the flaps of the cut-out form; tab-folders comprising guides adapted to receive the cut-out form, tab-folding members normally recessed in said guides, means for actuating said folding members to partially fold the tabs, projecting members having an edge adjacent to the folding members which hold the rear ends of the flaps while the folding members are actuated, means for conveying the cut-out form forward and a space formed behind the folding members to complete the tab-folding operation; a flap-interlocker comprising means to receive and support the cut-out form, wedge-like projections, means for folding the final wall of the cut-out form and means for releasing the folded box, and an actuating mechanism adapted to transmit motion at the required time to the various parts of the machine.

11. In a machine of the class described, a supporting frame; a cut-out form feeder having a receptacle provided with means for locating the cut-out form in ejecting position, flap-separators comprising an inclined face, a projection to contact the cut-out forms and means for establishing the position of said separators, an ejector adapted to engage one cut-out form at a time; a conveyor; slantingly ascending projections which converge at the ejecting end of the conveyor; tab-folders comprising a space between two members which guides the flap of the cut-out form and hold flaps in tab-bending position, tab-folding members normally recessed to permit the conveying of the flaps without interference, a space formed behind the tab-folding members when said members are in projecting position, means for conveying the cut-out form after the tabs are partially folded; a flap-interlocker comprising means to bend the scores defining the walls of the cut-out forms, wedge-like projections for locating the flaps in interlocking position and means to release the folded cut-out form, and a timed mechanism to actuate the various parts of the machine.

12. In a machine of the character described, a supporting frame; a cut-out form feeder having flap-separators to prevent the flaps of one cut-out form from being interfered with the flaps of another, and an ejector therefor; a conveyor comprising two sets of rotating rollers; flap-folding projections adjacent to said conveyor; tab-folders formed by supporting and folding members, means for detaining the conveying motion of the cut-out form during the time required to partially fold the tabs and means for continuing the conveying motion of the cut-out forms to complete the tab-folding operation; a flap-interlocker mechanism having a half-cylinder piece inside of which a portion of the cut-out form is conveyed, said half-cylinder piece having movable side walls on which walls wedge-like projections are installed, means to effect the partial rotation of the half-cylinder piece whereby the cut-out form is conveyed forwardly in co-operation with a finger which is adapted to engage the rear edge of said cut-out form, means for releasing the folded box, and a plurality of cams, followers and connecting rods to actuate the various parts of the machine.

13. In a machine of the class described, a supporting frame; a feeder receptacle for cut-out forms having a plurality of flap-separators and an ejector to engage the cut-out forms; a conveyor; ascending and converging flap-folding projections adjacent to said conveyor; tab-folders comprising tab-folding members and cut-out form conveying members; flap-interlocker comprising cut-out form receiving and supporting members, flap-guiding projections, means for controlling the final wall of the cut-out form, releasing means, and a timed mechanism having a set of rotating cams, followers engaging said cams, connecting rods and levers, adapted to convert the rotating motion of the cams into intermittent motions to actuate at a given time the various movable parts of the machine.

14. In a machine of the class described, a supporting frame; a feeder adapted to receive a stack of cut-out forms and to eject one of said forms at a time; a conveyor; flap-folding projections installed on the sides of said conveyor; tab-folding means; flap-interlocker having means adapted to fold the creases dividing the walls of a cut-out form, wedge-like projections that extend inward from the ends of said flap-interlocker, means for folding the final cut-out form wall, means for releasing the folded box from the machine and a timed mechanism adapted to operate the various parts of the machine.

15. In a machine of the class described, a supporting frame; cut-out form feeding means; flap-folding means; conveying means; tab-folders comprising means to support the rear portion of the flap during the tab-folding operation, tab-folding members normally recessed, space formed behind the tab-folding members when said members are in projecting position, guides to lead the cut-out forms to the flap-interlocker, said flap-interlocker having a curved wall, movable side walls, projections to guide the flaps to their interlocking position, means for conveying the final wall of the cut-out form within the curved wall, means for keeping the narrow wall of the cut-out form in engaging position with the wall of the blank which is finally closed, means for releasing from the machine the interlocked box and a timed mechanism which operates the movable parts of the machine.

16. In a machine of the class described, a supporting frame; a feeder having flap separators and a cut-out form ejector; a conveyor having flap-folding means; means for folding the tabs of said cut-out forms; a flap-interlocker having a half-cylinder piece in front of the guiding walls through which the cut-out form is conveyed, side disks fitted into said half-cylinder piece provided with actuating means so as to be located in cut-out form receiving position and in folded cut-out form releasing position, wedge-like projections mounted on said disks to lead the flaps to interlocking position, means to support the narrow wall of the cut-out form, means for partially rotating the half-cylinder piece and the said side disks, means for moving the final wall of the cut-out form to interlocking position, and a timed mechanism to actuate the various parts of the machine.

17. In a machine of the class described, a supporting frame; a set of timed cams, followers engaged with said cams, connecting rods to transmit the motion of the followers to the various actuating parts of the machine, an ejector provided with means to engage and release a cut-out form from the cut-out form feeder, said feeder having flap separators adapted to separate the flaps of the ejecting cut-out form from the flaps of another, means for directing a cut-out form forward; means for folding the flaps of said cut-out forms; tab-folding members normally in recessed position to permit the passing of the flaps without interference, a space formed behind said tab-folding members when said folding members are in projecting position, means for conveying the cut-out form after the tabs have been partially folded; a half-cylinder piece provided with side walls, wedge-like projections mounted on said walls, a member adapted to keep the narrow wall of the cut-out form in engaging position, means for inserting the final flap of the cut-out form with the tabs in folded position into said half-cylinder piece, and means for releasing the folded box from the machine, and a timed mechanism to actuate the various parts of the machine.

18. In a machine of the class described, a supporting frame; a feeder comprising a cut-out form receptacle, flap separators, means to keep said separators in their uppermost position when no cut-out forms are stacked, said separators having a projection extending within said receptacle adapted to contact the flaps of a cut-out form whereby the weight of said cut-out forms adjust the position of said flap-separators regardless of the curvature of the cut-out forms, an inclined face provided in said separators adapted to become located in the path of the ejecting flaps when the position of the separators is established so as to bend said ejecting flaps away from the flaps of the subsequent cut-out form, means to support the cut-out forms, an ejector adapted to propel one cut-out form at a time, gauges installed in the path of the ejecting cut-out forms, the lower edge of said gauges being located close to the means which support the cut-out forms so as to prevent the ejection of more than one cut-out form at a time; means to propel the cut-out form forward; projections adjacent to said cut-out form propelling means which ascend and bend convergingly so as to raise and bend the flaps of the cut-out form when said form is propelled; tab-folders having tab-folding members adapted to partially bend the tabs when the cut-out form is temporarily at rest, said tab-folding members being normally in a recessed position to permit the conveying of the flaps without interference, a space formed behind said tab-folding members whereby the partially folded tabs are passed to complete the tab-folding operation, supporting members adjacent to tab-folding members adapted to seize the flaps during the actuation of the tab-folding members; flap-interlocker having a half-cylinder piece adapted to be partially rotated and to receive a portion of the cut-out form, side disks fitted into said half-cylinder piece adapted to receive and support the flaps of the cut-out form, said side disk having means to engage the half-cylinder piece to effect their partial rotation when the half-cylinder piece so rotates, wedge-like projections mounted on said side disks adapted to bend the incoming flaps inwardly so as to locate said flaps in interlocking position, a supporting member which projects from the half-cylinder piece to keep the narrow wall of the cut-out form in engaging position, and means for conveying the final flaps of the cut-out form within the half-cylinder piece, and a timed mechanism to actuate the movable parts of the machine.

19. In a machine of the character described, a frame to support directly or indirectly the various parts of the machine; a cut-out form feeder adapted to eject a cut-out form at a time, said feeder having flap-separators the position of which is controlled by the weight and curvature of the cut-out forms; a conveyor; flap-folding means; means to detain the conveying motion of the cut-out form while the tabs are folded and means to continue said conveying motion; a flap-interlocker having means for receiving the cut-out forms and for bending the scores defining the walls of said cut-out forms, side walls to support the flaps, projections mounted on said side walls adapted to bend the incoming flaps whereby the subsequent flaps are located in contact with the outer face of the bended flaps, means for conveying the final wall of the cut-out form whereby the flaps of said final wall become interlocked, means for releasing from the machine the interlocked cut-out form, and a timed mechanism to actuate the movable parts of the machine.

20. In a machine of the class described, a supporting frame; a feeder having means to support the central portion of the cut-out forms, a plurality of flap separators adapted to contact the flaps of the cut-out form without regard to the degree of curvature presented by said cut-out forms whereby an inclined face of said separators is adjusted in the path of the flaps of the ejecting cut-out form, side movable guides adapted to contact the edges of the cut-out forms to locate said forms in ejecting position, an ejector having means to engage and convey forward a cut-out form at a time, and a gauge to present an open space between said gauge and the cut-out form supporting members; a conveyor; flap-folding means; tab folders having means to seize the flaps while the tab-folding members are actuated; flap-interlocker comprising means to receive the cut-out forms and fold the creases defining the walls of said forms, movable side walls, triangular flap-interlocking pieces mounted on said side walls, said triangular pieces having an edge flush with the face of the side walls, the other two edges having a wedge-like shape therefore forming a projecting vertex at the intersection of said wedge-like edges, said projecting vertex being adapted to bend the flaps inwardly so as to provide space whereby the subsequent flaps are inserted and become interlocked, means for releasing the interlocked cut-out form from the machine, and a mechanism to control at the required time the movable parts of the machine.

GONZALO ANCIRA.